(12) United States Patent
Marinelli

(10) Patent No.: US 12,410,867 B2
(45) Date of Patent: Sep. 9, 2025

(54) PIN LOCKING DEVICE FOR A SEALING COMPONENT OF A SEAL CARTRIDGE ASSEMBLY AND METHOD FOR ASSEMBLING THE SEAL CARTRIDGE

(71) Applicant: Siemens Energy Global GmbH & Co. KG, Munich (DE)

(72) Inventor: Giampiero Marinelli, Montivilliers (FR)

(73) Assignee: Siemens Energy Global GmbH & Co. KG, Munich (DE)

( * ) Notice: Subject to any disclaimer, the term of this patent is extended or adjusted under 35 U.S.C. 154(b) by 377 days.

(21) Appl. No.: 17/923,591

(22) PCT Filed: Apr. 27, 2021

(86) PCT No.: PCT/EP2021/060985
§ 371 (c)(1),
(2) Date: Nov. 6, 2022

(87) PCT Pub. No.: WO2021/239362
PCT Pub. Date: Dec. 2, 2021

(65) Prior Publication Data
US 2023/0184335 A1 Jun. 15, 2023

(30) Foreign Application Priority Data
May 26, 2020 (EP) .................................... 20290046

(51) Int. Cl.
*F16J 15/34* (2006.01)
(52) U.S. Cl.
CPC .................................. *F16J 15/348* (2013.01)
(58) Field of Classification Search
CPC ........ F16J 15/34; F16J 15/3426; F16J 15/348; F16J 15/3484; F16J 15/3488; F16J 15/3248; F16J 15/3252; F16J 15/3256
(Continued)

(56) References Cited

U.S. PATENT DOCUMENTS 1,049,984 A * 1/1913 Bowers ..................... F16B 3/00
   403/318
4,688,807 A * 8/1987 Warner .................. F16J 15/348
   277/397

(Continued)

FOREIGN PATENT DOCUMENTS

| CN | 101031743 A | 9/2007 |
| CN | 102648373 A | 8/2012 |

(Continued)

OTHER PUBLICATIONS

PCT International Search Report and Written Opinion of International Searching Authority mailed Dec. 2, 2021 corresponding to PCT International Application No. PCT/EP2021/060985 filed Apr. 27, 2021.

*Primary Examiner* — Nathan Cumar
(74) *Attorney, Agent, or Firm* — Wolter Van Dyke Davis, PLLC

(57) ABSTRACT

A pin locking device for assembling a first and a second sealing component of a seal cartridge which includes a pin body with a longitudinal bore, wherein an inner wall of the bore includes fixing device that cooperates with an extraction tool. The pin body has two parts arranged longitudinally one after the other. A first part is configured for fitting a pin cavity of the first sealing component and a second part is configured for fitting a locking cavity of the second sealing component. A spring configured for moving the pin body from a withdrawn position, where the pin body is entirely located within a pin cavity of the first sealing component, towards a locked position wherein a second part of the pin body is located and maintained within a locking cavity of the second sealing component while a first part remains located within the pin cavity.

16 Claims, 4 Drawing Sheets

(58) Field of Classification Search
USPC .......................................................... 70/378
See application file for complete search history.

(56) References Cited

U.S. PATENT DOCUMENTS

| | | | | |
|---|---|---|---|---|
| 4,930,930 | A * | 6/1990 | Coppa ................... | E04B 1/1909 |
| | | | | 52/645 |
| 5,667,331 | A * | 9/1997 | Lindenthal ................ | F16D 3/06 |
| | | | | 403/41 |
| 5,966,971 | A * | 10/1999 | Keller ................. | E05B 27/0021 |
| | | | | 70/378 |
| 7,979,986 | B2 * | 7/2011 | Simmons ............... | F16J 15/348 |
| | | | | 277/306 |
| 12,117,082 | B2 * | 10/2024 | Marinelli ............... | F16J 15/002 |
| 2008/0174073 | A1 * | 7/2008 | Simmons ............... | F16J 15/348 |
| | | | | 277/306 |
| 2008/0191428 | A1 | 8/2008 | Kane | |
| 2011/0121559 | A1 | 5/2011 | Gunderson | |
| 2014/0070530 | A1 | 3/2014 | Haeckel | |
| 2018/0044894 | A1 | 2/2018 | Tuto | |

FOREIGN PATENT DOCUMENTS

| | | | |
|---|---|---|---|
| CN | 103675170 A | 3/2014 | |
| CN | 105257653 A | 1/2016 | |
| EP | 0638738 A1 | 2/1995 | |
| EP | 2952639 A1 | 12/2015 | |
| GB | 1584866 A | 2/1981 | |
| WO | 9721880 A1 | 6/1997 | |
| WO | WO-03014602 A1 * | 2/2003 | ............. F16J 15/028 |

* cited by examiner

PIN LOCKING DEVICE FOR A SEALING COMPONENT OF A SEAL CARTRIDGE ASSEMBLY AND METHOD FOR ASSEMBLING THE SEAL CARTRIDGE

CROSS REFERENCE TO RELATED APPLICATIONS

This application is the US National Stage of International Application No. PCT/EP2021/060985 filed 27 Apr. 2021, and claims the benefit thereof. The International Application claims the benefit of European Application No. EP20290046 filed 26 May 2020. All of the applications are incorporated by reference herein in their entirety.

FIELD OF INVENTION

The invention relates to the technical field of mechanical seals for machines comprising rotating assemblies, like a shaft, and concerns more precisely the assembly of mechanical seals as a cartridge.

BACKGROUND OF INVENTION

Mechanical seals are mechanical devices that are designed for helping to join mechanical components together by preventing leakage, and/or containing pressure, and/or excluding contamination. They are notably widely used in machines comprising rotating assemblies, like dry gas seals (i.e. a mechanical seal using a sealing gas to create a barrier between a process gas and the atmosphere) equipping most of the centrifugal gas compressors or gas turbines. Mechanical seals for rotating assemblies, and in particular dry gas seals, are available in a great variety of configurations and are usually contained within one or several cartridges. For instance, tandem dry gas seals comprise a primary seal and a secondary seal contained within a single cartridge, wherein the secondary seal serves as backup in case of failure of the primary seal.

The seal cartridge might be described as an assembly of mechanical components that forms typically a cylindrical hollow body and has therefore a cylindrical hollow shape, wherein the hollow part is configured for receiving a shaft or rotating member against and/or around which seal components of the cartridge are arranged, said cylindrical hollow body being then installed in a shaft casing—also called seal cavity—of the machine, configured for enclosing the shaft and its annularly arranged cartridge, wherein the latter provides a sealing between the shaft and the casing of the machine. One of the main advantages of using a seal cartridge for sealing a shaft is its removability: the seal cartridge is indeed mounted removable inside the shaft casing (or seal cavity), annularly around the shaft, so that removing/installing the cartridge removes/installs at the same time all sealing components comprised within the seal cartridge, enabling a quick assembly/disassembly of the sealing components.

Typically, a seal cartridge comprises an axial stack of ring-shaped sealing components configured for being mounted annularly around the shaft (i.e. according to the longitudinal direction of the stack), giving rise therefore to said cylindrical hollow shape of the cartridge. Among said ring-shaped sealing components (or annular components), one can distinguish:
- housing components that are ring-shaped sealing components characterized by an outside diameter that is configured for matching an inner space of the shaft casing; and
- shaft sleeve components that are ring-shaped sealing components characterized by an inside diameter configured for matching the size, i.e. diameter, of the shaft.

According to usual cartridge constructions, housing components are mounted or located radially over the shaft sleeves and are usually designed for maintaining in a predefined position within the cartridge other ring-shaped sealing components like stationary sealings or clamping rings, and/or for serving as support for such ring-shaped sealing components. During rotation of the shaft, the housing components are configured for remaining stationary with respect to said rotation. As for the shaft sleeve, it is configured for shrouding the shaft so as to form a sleeve around said shaft. It can remain stationary or be driven into rotation by the rotation of the shaft. In this case, the shaft sleeve rotates together with the shaft, at the same angular speed. The outside diameters and inside diameters of the stack of housing components and shaft sleeves define respectively an external and an internal substantially cylindrical surface of the seal cartridge that fits respectively within said internal space of the shaft casing or seal cavity of the machine (e.g. a pump or compressor) and with the shaft geometry of said machine so that the shaft can be received within the hollow part of the cartridge when mounting the seal cartridge inside said shaft casing. The housing components are usually coupled or fixed to each other by means of screws and/or bolts for forming a united body, i.e. said cartridge, enclosing all sealing components. Typically, radial or axial screws are used for axially or radially coupling the housing components, as well as the shaft sleeve components.

Prior art cartridges are complex devices whose assembly and disassembly require specific knowledge and skills for mounting or dismounting the different cartridge ring-shaped sealing components. For instance, unprecise assembly of the different ring-shaped sealing components, e.g. a misalignment, may strongly decrease the efficiency of the sealing or may lead to a failure, e.g. a screw rupture or thread damage.

SUMMARY OF INVENTION

An objective of the present invention is to propose a pin locking device for a sealing component of a seal cartridge assembly and a method for mounting sealing components of a seal cartridge assembly that facilitate the assembly and disassembly of the seal cartridge, and that provide a less complex and more compact cartridge, and consequently a simpler manufacturing of the cartridge components.

This objective is solved by the measures taken in accordance with the independent claims. Further advantageous embodiments are proposed by the dependent claims.

The present invention concerns a pin locking device for coupling and securing together two sealing components of a seal cartridge. The latter is configured for providing a sealing between a rotatable shaft that typically equips a machine, like a compressor, and a shaft casing of such a machine. As known in the art, the shaft casing is configured for surrounding and enclosing the seal cartridge annularly mounted around the shaft usually centered in its casing. The seal cartridge has notably a substantially hollow shape, preferentially a substantially cylindrical hollow shape, around a longitudinal axis A passing by the center of the seal cartridge and corresponding to the axis of rotation of the shaft when the seal cartridge surrounds said shaft in the shaft casing or seal cavity, i.e. when it is mounted annularly around said rotatable shaft in said shaft casing/cavity. The seal cartridge, i.e. its hollow shape, is typically characterized by an external size, e.g. an external diameter, configured for matching an internal space of the shaft casing, and an internal diameter configured for matching the size (i.e. diameter) of the rotatable shaft. Of course, the (cylindrical) hollow shape might also be characterized by several external sizes (diameters) and/or internal diameters for matching a shaft casing and/or shaft characterized by different radial sizes.

The seal cartridge comprises a set or stack of sealing components, preferentially ring-shaped sealing components, configured for being removably assembled with each other so as to form the seal cartridge. According to the present invention, at least one of said sealing components, called hereafter the first sealing component, is configured for being coupled and secured to another sealing component—called hereafter the second sealing component—of the seal cartridge by means of the pin locking device according to the invention.

More precisely, the pin locking device according to the invention is configured for locking the first sealing component together with the second sealing component, and comprises: —a pin body, preferentially characterized by a substantially cylindrical shape, comprising a longitudinal bore extending along a longitudinal axis C of extension, said longitudinal bore defining a cavity within the pin body, said cavity being preferentially centered within the pin body, e.g. centered within said cylindrical shape around said longitudinal axis C of extension, (said cavity being notably cylindrical and extending along said longitudinal axis C of extension), said cavity being preferentially blind or extending along said longitudinal axis C throughout the pin body.

According to the present invention, an inner wall of said bore comprises fixing means, that comprise for instance a screw thread (the bore being in other words a threaded hole), e.g. formed around said inner wall, said fixing means being configured for cooperating with an extraction tool, e.g. a screw characterized by said screw thread and having a diameter substantially equals to the diameter of the threaded bore, the latter being configured for receiving said screw. The pin body according to the invention comprises preferentially two parts arranged longitudinally one after the other one along said longitudinal axis C: a first part and a second part.

Preferentially, the cross section of the second part is smaller than, and comprised within, the cross section of the first part when the latter are projected onto a same plane perpendicular to the longitudinal axis C, both cross sections being transverse cross sections, i.e. being taken perpendicular to said longitudinal axis C. In particular, according to first preferred embodiment, the first part has a same and constant transverse cross section over its length which is different from the transverse cross section of the second part, which is also constant and the same over the length of the second part, wherein said lengths are measured along the longitudinal axis C.

According to another embodiment, the first and second parts have a same and constant transverse cross section over the whole longitudinal length of the pin body. According to the present invention, the first part is configured for fitting a pin cavity of the first seal component (i.e. the size of the pin cavity matches the size of the first part of the pin body) and the second part is configured for fitting a locking cavity of the second sealing component (i.e. the size of the locking cavity matches the size of the second part of the pin body), wherein the first part is prevented to enter this locking cavity either because of its larger radial size compared to the second part or due to a finite length of the cavity if the pin body has a constant and same cross section over its whole length. In case of the cross section of the second part being smaller that the cross section of the first part (see e.g. FIGS. 3 and 4), then the first part, in particular an edge of the latter, is configured for contacting a contact surface S3—called hereafter the third contact surface—of the second sealing component onto which the locking cavity opens when the second part is fitted inside said locking cavity.

According to the present invention, the first sealing component and the second sealing component are complementary sealing components configured for being fixed with one another and/or for interlocking with one another. For instance, the pin body has a cylindrical shape extending according to its length L along the longitudinal axis C with a nominal radius R1 and comprises, at one of its extremities, a flange characterized by a radius R2<R1 and a length L2 measured along the longitudinal axis C, so that the first part is the cylindrical shape of length L-L2 and radius R1, and the second part is the cylindrical shape comprising said flange and therefore of length L2 and radius R2, the first part and second part being aligned with each other, the longitudinal axis C passing by their center.

The pin locking device also comprises a spring, e.g. a coil spring or a wave spring, configured for extending and contracting (negative extension, i.e. compression) along said longitudinal axis C when installed in the pin cavity. The spring is further configured for exerting a spring force along said longitudinal axis C against the pin body, so that the spring force tends to move the pin body away from the end of the pin cavity. In particular, the spring is configured for leaning on a first contact surface of the pin cavity of the first sealing component on one side (said first contact surface corresponding to an end of the pin cavity longitudinally opposed to its opening, both opening and end being aligned, notably with respect to the longitudinal axis C when the pin body is comprised within said pin cavity) and for having its other side contacting a second contact surface, wherein said second contact surface is a surface, e.g. external surface, of the pin body onto which said bore opens out. The spring, or more precisely its spring force, is configured for moving or pushing the pin body from a withdrawn position towards a locked position and for maintaining the pin body in said locked position. According to the present invention, in the withdrawn position, the pin body is entirely located within the pin cavity: it corresponds to a compressed state of the spring. In the locked position, the second part of the pin body is received or located within the locking cavity and maintained by the spring force in the latter, while the first part remains located within said pin cavity, the pin body bridging therefore the first sealing component and the second sealing component.

The fixing means of the bore are configured for cooperating with said extraction tool in order to maintain the pin body in the withdrawn position (i.e. the pin body is maintained compressing the spring against the end of the pin cavity) when assembling the first sealing component to the second sealing component. In the locked position, the pin body prevents a radial motion or displacement (radial with respect to the longitudinal axis C, i.e. a motion perpendicular to said longitudinal axis C) of the pin cavity relatively to the locking cavity, keeping therefore the cavity aligned with one another according to the longitudinal axis C, wherein a longitudinal motion of the first sealing component with respect to the second sealing component is prevented by their complementary geometry, e.g. one of said first or second sealing component being a sleeve for the other one at the location of said pin cavity and/or locking cavity.

According to the present invention, the fixing means enable to hold the pin body in the withdrawn position when interacting with the extraction tool. Further and preferentially, the interaction of the fixing means with the extraction tool is also configured for gradually compressing the spring, e.g. by rotation of the extraction tool around the longitudinal axis C and according to a first direction of rotation, and then for maintaining the pin body in the withdrawn position when assembling the first sealing component with the second sealing component, wherein a release of said interaction, e.g. by removing the extraction tool or by rotating the latter in a direction opposite to said first direction of rotation, is configured for releasing the spring, the latter pushing then the pin body in its locked position, which results in a locking of the first sealing component with the second sealing component. For instance, the extraction tool is configured for being insertable in a boring of the first sealing component for interacting with the fixing means of the pin body, said boring going throughout a wall of the first sealing component and opening onto said first contact surface. The spring has preferentially a hollow shape, e.g. a cylindrical hollow shape preferentially around said longitudinal axis C: advantageously such a shape enables the extraction tool to pass though the hollow part in order to reach the fixing means of the bore. In other words, the interaction of the extraction tool with the fixing means of the pin body is configured for maintaining the latter in said withdrawn position (wherein the spring is in a first compressed state), in order to facilitate assembling the first sealing component with the second sealing component, wherein the release of the interaction releases at the same time the spring which extends from said first compressed state to a second compressed state wherein it maintains the pin body in the locked position.

The present invention concerns also a seal cartridge comprising said first sealing component and said second sealing component, wherein the first sealing component comprises said pin cavity and the second sealing component said locking cavity. Preferentially, the first sealing component and the second sealing component are annularly interlocked with each other so that a radial motion is prevented. The pin locking device enables then to further prevent a relative longitudinal motion of the first sealing component with respect to the second sealing component.

Preferentially, the pin cavity and the locking cavity are cylindrical cavities characterized by a different diameter, the pin cavity being characterized by a radius R1' matching, i.e. substantially equal to, the radius R1 so that the first part of the pin body is guided by the walls of the pin cavity (by contacting the latter) during the motion of the pin body from the withdrawn position to the locked position, said radius R1' being greater than a radius R2' characterizing the diameter of the locking cavity configured for receiving the first part, wherein the radius R2' is configured for matching, i.e. for being substantially equal to, the radius R2 so that the second part of the pin body is guided by the walls of the locking cavity (by contacting the latter) during the motion of the pin body from the withdrawn position to the locked position.

The pin cavity of the first sealing component is further characterized in that it comprises said first contact surface against/on which the spring is resting/leaning. Additionally, the first sealing component according to the invention comprises said boring drilled throughout the width of one of its walls, said boring going from one side of the wall to the other side of the wall where it opens onto said first contact surface, wherein said boring, as well as the pin cavity, extends longitudinally along said longitudinal axis C, so that the extraction tool may interact with the fixing means of the bore of the pin body by inserting said extraction tool from said one side of the wall until reaching and interacting with said fixing means on the other side of the wall of the first sealing component. According to the present invention, the first sealing component is configured for being locked/fixed to the second sealing component by means of one or several pin locking devices according to the invention. When assembled to each other, then the boring, the pin cavity, the bore of the pin body and the locking cavity are preferentially aligned with each other, e.g. the longitudinal axis C passing by the center of each of the latter.

The present invention concerns also a method for assembling a seal cartridge, the method comprising assembling the sealing components, preferentially ring-shaped sealing components, with each other in order to form said stack of sealing components, and being characterized in that it comprises coupling and locking at least one of said sealing components—i.e. said first sealing component—to another of said sealing components—i.e. to said second sealing component—of the seal cartridge by means of the previously described pin locking device. In particular, said method comprises locking each pin body of the first sealing component in the withdrawn position by interaction of the extraction tool with the fixing means of the bore of each pin body, then moving and/or positioning the first sealing component with respect to the second sealing component until each of the pin cavities is aligned on a corresponding locking cavity of the second sealing component, and releasing each pin body by removing/stopping the interaction of the extraction tool with the fixing means, the release of each pin body resulting in a motion of the latter from the withdrawn position to the locked position wherein said second part is fitted and received inside said locking cavity of the second sealing component.

According to the present invention and preferentially, the first sealing component and/or the second sealing component are each a ring-shaped sealing component configured for being secured (or fixed) to one another. The motion of the pin body from the withdrawn position to the locked position might be a radial motion with respect to the shaft or a longitudinal one. In case of a radial motion, and if the first sealing component and the second sealing component are rotating components (i.e. driven into rotation by the rotation of the shaft), the first sealing component, second sealing component and the pin locking device are configured for having the locked position located radially farther than the withdrawn position with respect to the shaft so that a rotation of the paired first and second sealing components does not result in a displacement of the pin body form the locked position to the withdrawn position.

Preferentially, the first sealing component and/or the second sealing component are each configured for being mounted annularly around the shaft and are each characterized by an inner diameter configured for matching the size or one of the sizes (i.e. diameter) of the shaft. Alternately or additionally, the first sealing component and/or the second sealing component are each configured for being mounted annularly around the shaft and are each characterized by an outer size or diameter configured for matching the size or one of the sizes of the shaft casing. Preferentially, the first sealing component and the second sealing component are configured for remaining stationary during a rotation of the rotatable shaft. In particular, the first sealing component and/or the second sealing component can comprise at least one part configured for rotating together with the rotatable shaft during a rotation of the rotatable shaft, and can comprise optionally another part that remains stationary. In particular, the whole first sealing component and/or the whole second sealing component is configured for rotating together with said rotatable shaft. Preferentially, the first sealing component is a housing component and/or a shaft sleeve. Similarly, the second sealing component is a housing component and/or a shaft sleeve. It is for instance a housing component configured for forming at the same time a sleeve around the shaft.

BRIEF DESCRIPTION OF THE DRAWINGS

Further description and details of the invention will be described now based on preferred embodiments illustrated by the following figures.

DETAILED DESCRIPTION OF INVENTION

Figure 1:
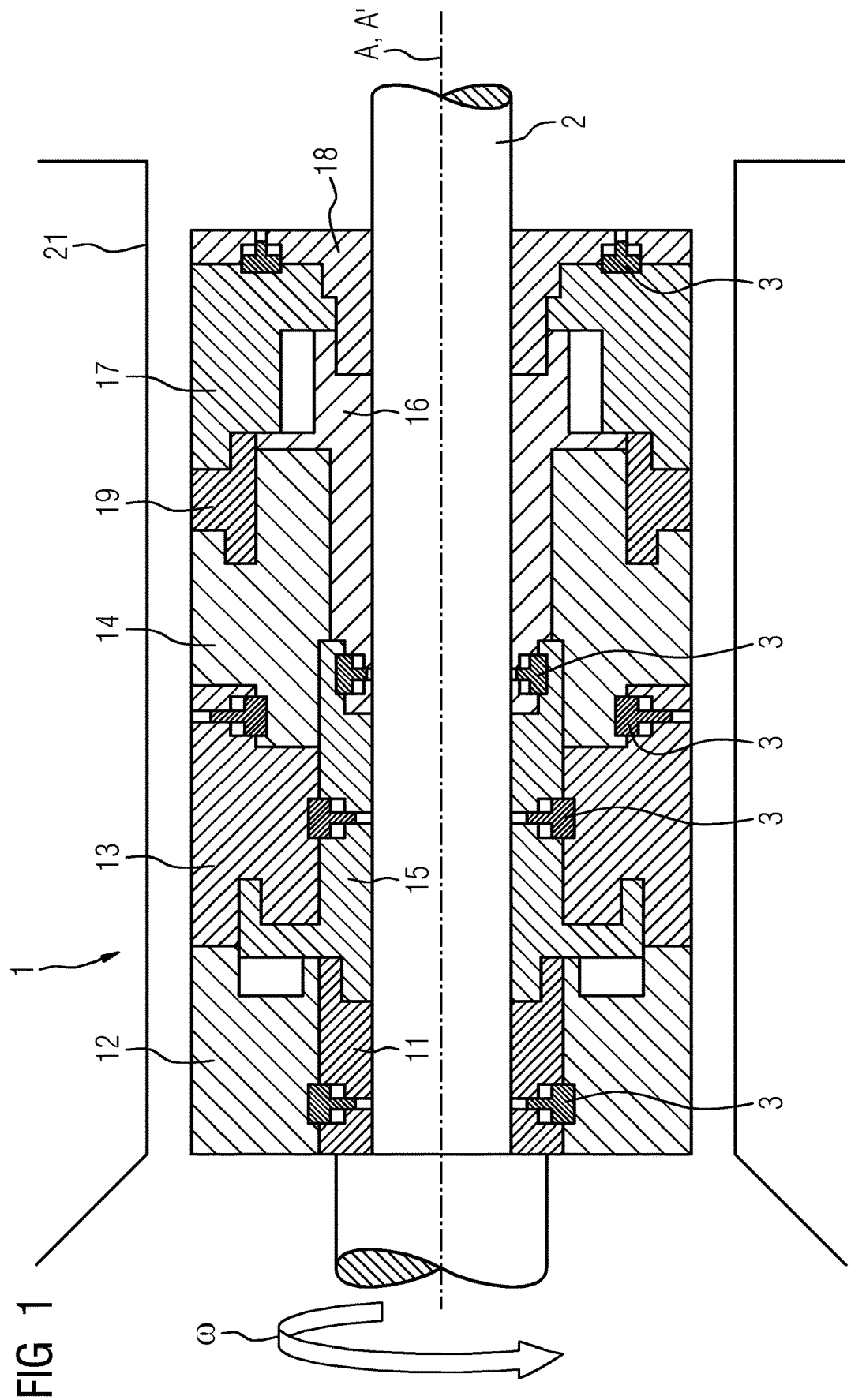
FIG. 1 Cross sectional side view of a schematic representation of a seal cartridge according to the invention.

FIG. 1 shows a longitudinal cross-section of a schematic representation of a seal cartridge 1 according to the invention. As known in the art, the seal cartridge 1 may comprise a stack of various sealing components 11-19, preferentially ring shaped sealing components, built according to different configurations and geometries. By stack, it has to be understood an axially centered assembly ("axially centered" with respect to the longitudinal axis of the seal cartridge) of sealing components, wherein the sealing components are preferentially mounted one after another axially on top (when considering the longitudinal axis of the cartridge being vertical) and/or radially around (or over) a previously mounted sealing component, forming therefore a kind of pile or stack of sealing components which results in said cartridge. The aim of FIG. 1 is simply to present the concept of the invention without focusing on any specific seal cartridge type, configuration, geometry, or construction.

According to FIG. 1, the seal cartridge 1 is mounted annularly around a rotatable shaft 2 that is configured for rotating around a longitudinal axis A' of rotation according to an angular speed w. The seal cartridge 1 is configured for being removably installed in a shaft casing 21 which surrounds and encloses the shaft 2 and its sealings provided by the seal cartridge 1. The seal cartridge 1 typically provides a sealing between the rotatable shaft 2 and the shaft casing 21, preventing for instance any leakage of a process gas or contamination of the process gas. Preferentially, the seal cartridge according to the invention is a dry gas seal cartridge. The seal cartridge has typically a cylindrical shape centered around a longitudinal axis A that coincides with the longitudinal axis A' when the seal cartridge is mounted in the shaft casing 21 annularly around the shaft 2.

According to the present invention, at least one, or a part, or each sealing component 11-19 of the seal cartridge is configured for being coupled or secured to at least one another sealing component by means of a pin locking device 3 according to the invention. As already explained, the sealing components coupled by means of the pin locking device 3 are called respectively the first sealing component and the second sealing component. While in the present illustration of the invention the first and second sealing components are ring-shaped sealing components, other hollow shapes configured for fitting within a shaft casing 21 might be considered. The coupling according to the claimed pin locking device 3 is advantageously free of any screw and/or bolt that would fix the first and second sealing component together.

As schematically shown in FIG. 1, a first ring shaped sealing component 11 is for instance a shaft sleeve coupled by means of the claimed pin locking device 3 to a second ring shaped sealing component 12, wherein the second ring shaped sealing component 12 is a housing component configured for housing one or several seal elements and located radially over the first ring shaped sealing component 11. Or a third ring shaped sealing component 13 is a housing component coupled to a fourth ring shaped sealing component 14 by means of one or several pin locking devices 3, wherein the fourth ring shaped sealing component 14 is also a housing component configured for housing one or several seal elements. A fifth ring shaped sealing component 15 is for instance a shaft sleeve that is coupled by means of said pin locking device 3 to one or several ring-shaped sealing components, e.g. to the third ring-shaped sealing component 13 on one radial side of the fifth ring-shaped sealing component 15 and/or to a sixth ring-shaped sealing component 16 on an axial side of the fifth ring-shaped sealing component 15, wherein the sixth ring-shaped sealing component 16 is also a shaft sleeve. For instance, a seventh ring-shaped sealing component 17 is a housing component coupled by means of said pin locking device 3 to an eighth ring-shaped sealing component 18 that is a shaft sleeve.

The first and second sealing components according to the invention might be any ring-shaped, i.e. annular, sealing component of the seal cartridge, like a housing or a shaft sleeve or a ring, etc. Preferentially, the first sealing component is a housing component of the seal cartridge and it is coupled by means of the pin locking device 3 to another component that is:

a labyrinth seal of the seal cartridge; or
another housing component of the seal cartridge; or
a barrier seal of the seal cartridge; or
a stationary sleeve of the seal cartridge; or
a stationary seal ring of the seal cartridge.

The first sealing component might also be a rotatable seal cartridge shaft sleeve, e.g. a shaft sleeve affixed to the shaft and enclosing a mating ring, the shaft sleeve and mating ring rotating at the shaft rotational speed, wherein the shaft sleeve is coupled by means of the pin locking device 3 to another component that is:

another shaft sleeve of the seal cartridge; or
a ring of the seal cartridge, like a mating ring; or
another component of the seal cartridge that is configured for rotating together with the shaft sleeve.

Figure 2:
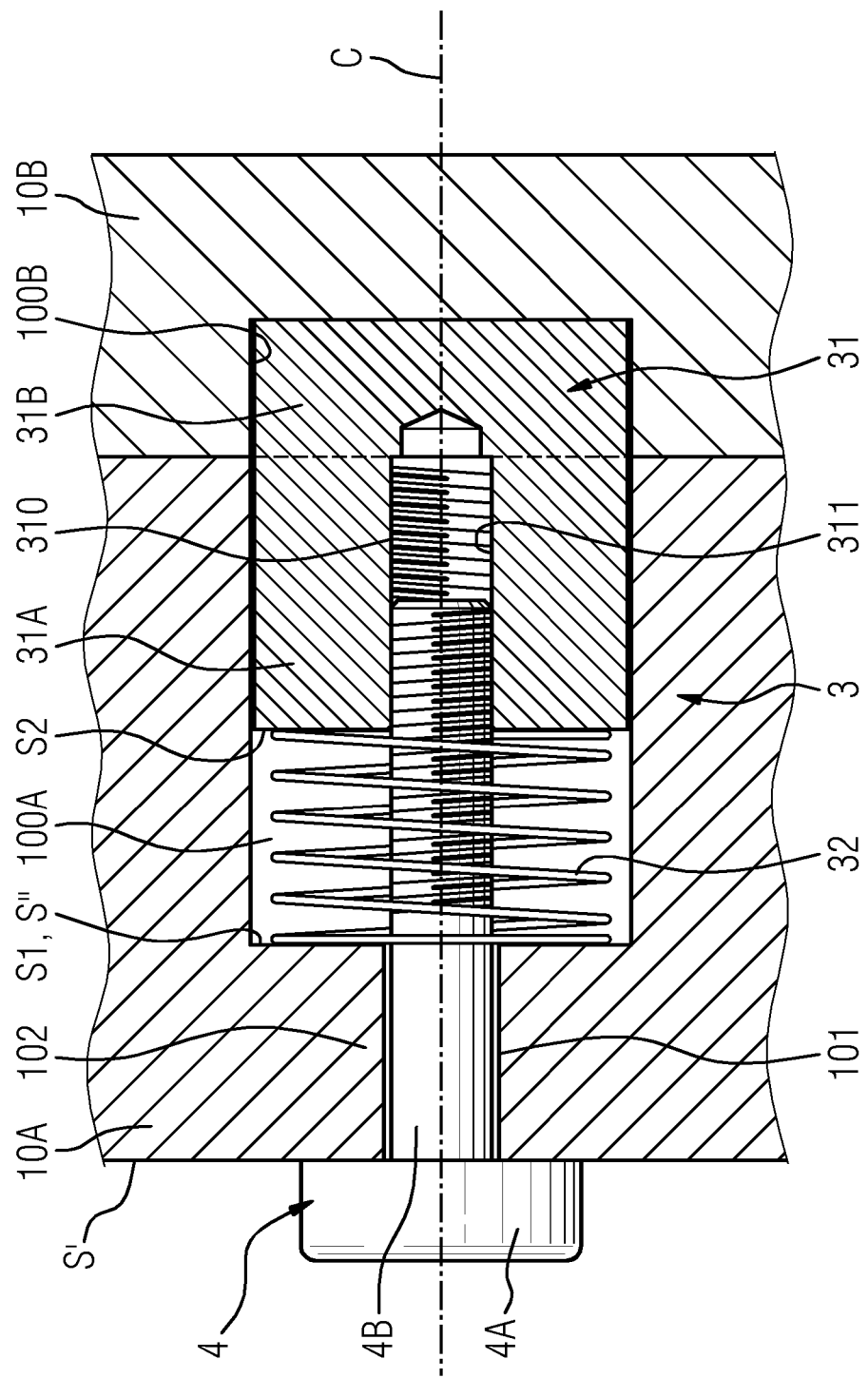
FIG. 2 Longitudinal cross section of a schematic representation of a preferred pin locking device according to the invention.

FIG. 2 shows in more details a pin locking device 3 according to the invention. Said pin locking device 3 comprises a pin body 31 and a spring 32. The pin body 31 is configured for interacting with an extraction tool 4 for compressing the spring 32 against the end of a pin cavity 100A until the pin body 31 reaches a withdrawn position wherein the entire pin body 31 is located within the pin cavity 100A. Of course, the size of the pin cavity 100A is configured for receiving the spring 32 and the pin body 31, e.g. the pin cavity length being equal or greater than the spring length in its compressed form added to the length of the pin body 31, wherein said lengths are measured along a longitudinal axis C (see FIG. 2).

For enabling said interaction with the extraction tool 4, the pin body 31 comprises a longitudinal bore 310 extending along said longitudinal axis C. Said bore 310 can be a blind bore as shown in FIG. 2 or a traversing bore going throughout the pin body 31 as shown in the preferred embodiments of FIGS. 3 and 4. This bore 310 comprises fixing means for interacting with the extraction tool 4. The fixing means are configured for fixing or clamping the pin body 31 to a fixing part of the extraction tool 4, wherein said fixing part is configured for being inserted in the bore 310 in order to interact with the fixing means.

For instance, the fixing means are a screw thread arranged in said bore 310, e.g. on an inner wall 311 of said bore 310 and the extraction tool 4 has the shape of a screw comprising a head 4A and a cylindrical rod 4B fixed at one of its extremities to said head 4A and comprising at its other extremity said fixing part. Preferentially, the extraction tool 4 is configured for being inserted within a boring 101 of the first sealing component wherein said boring 101 extends longitudinally from one side S' that is accessible to an operator during assembling the cartridge to another side S" of a wall 102 of the first sealing component, along a longitudinal axis that is aligned with the longitudinal axis of the pin cavity 100A and of the pin body 31 when the latter is installed within the pin cavity 100A. Said boring 101 opens out in the pin cavity 100A, traversing therefore the wall 102 that separates the end of the pin cavity 100A from the extraction tool head when said cylindrical rod 4B is inserted in the boring 101. The fixing part is configured for interacting with the fixing means of the bore 310. In particular, said fixing part comprises a complementary screw thread that is a screw thread complementary to the screw thread of the bore 310. Indeed, in order to compress the spring 32 against the first contact surface S1 which corresponds to the end of the pin cavity 100A and to said other side S" of said wall 102, the head 4A can be rotated around the longitudinal axis C by an operator. Due to said rotation, the complementary screw thread of the fixing part engages with the screw thread of the bore 310, screwing in other words the fixing part into the pin body 31 and since the head 4A of the extraction tool 4 is configured for resting against the side S', said screwing results in a displacement of the pin body in the direction of the end of the cavity (i.e. in direction of the first contact surface S1 or S"), said displacement compressing the spring 32 between the end of the cavity and the second contact surface S2 of the pin body 31.

Figure 3:
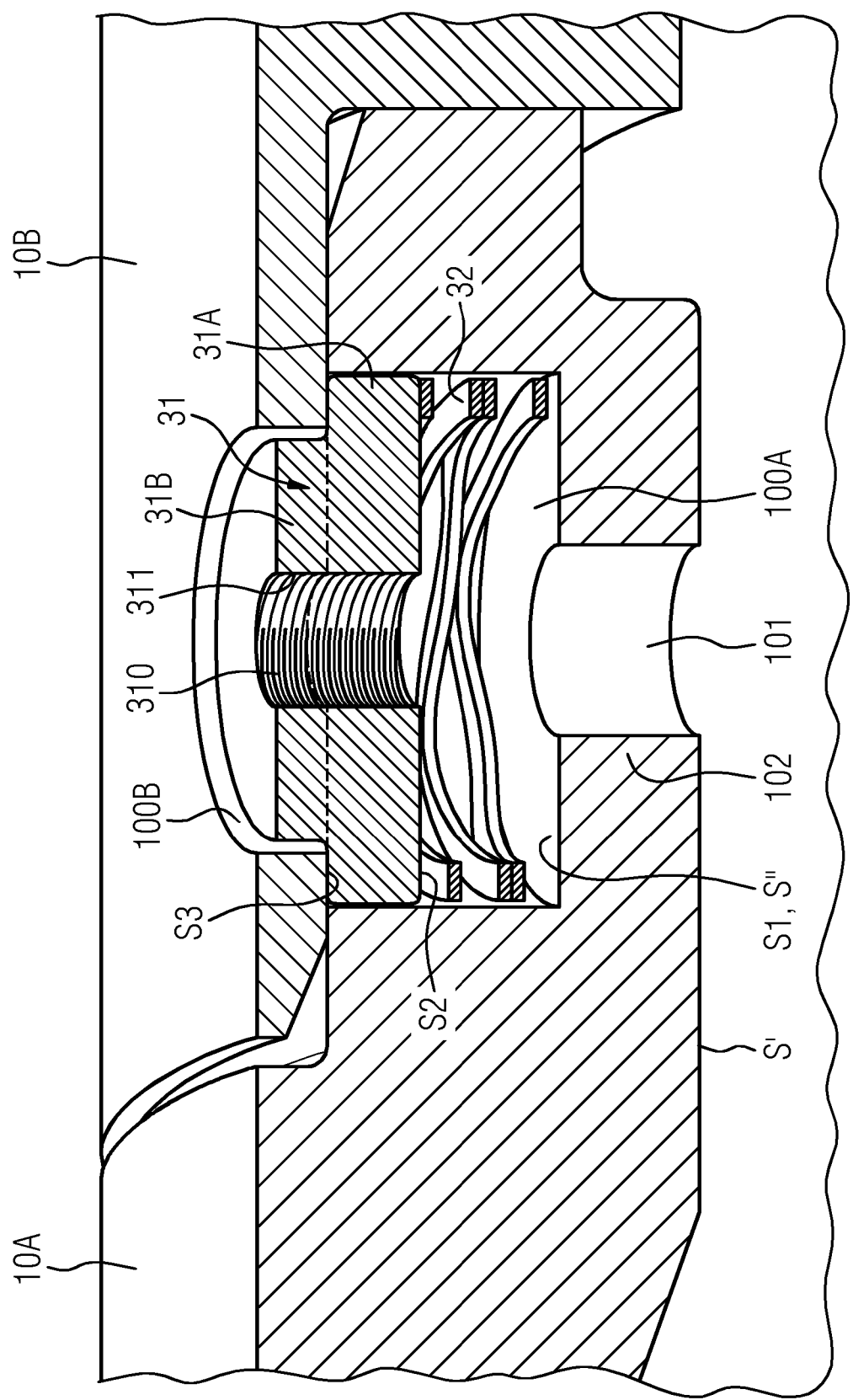
FIG. 3 Three-dimensional schematic representation of a longitudinal cross-section of another preferred pin locking device according to the invention.
Figure 4:
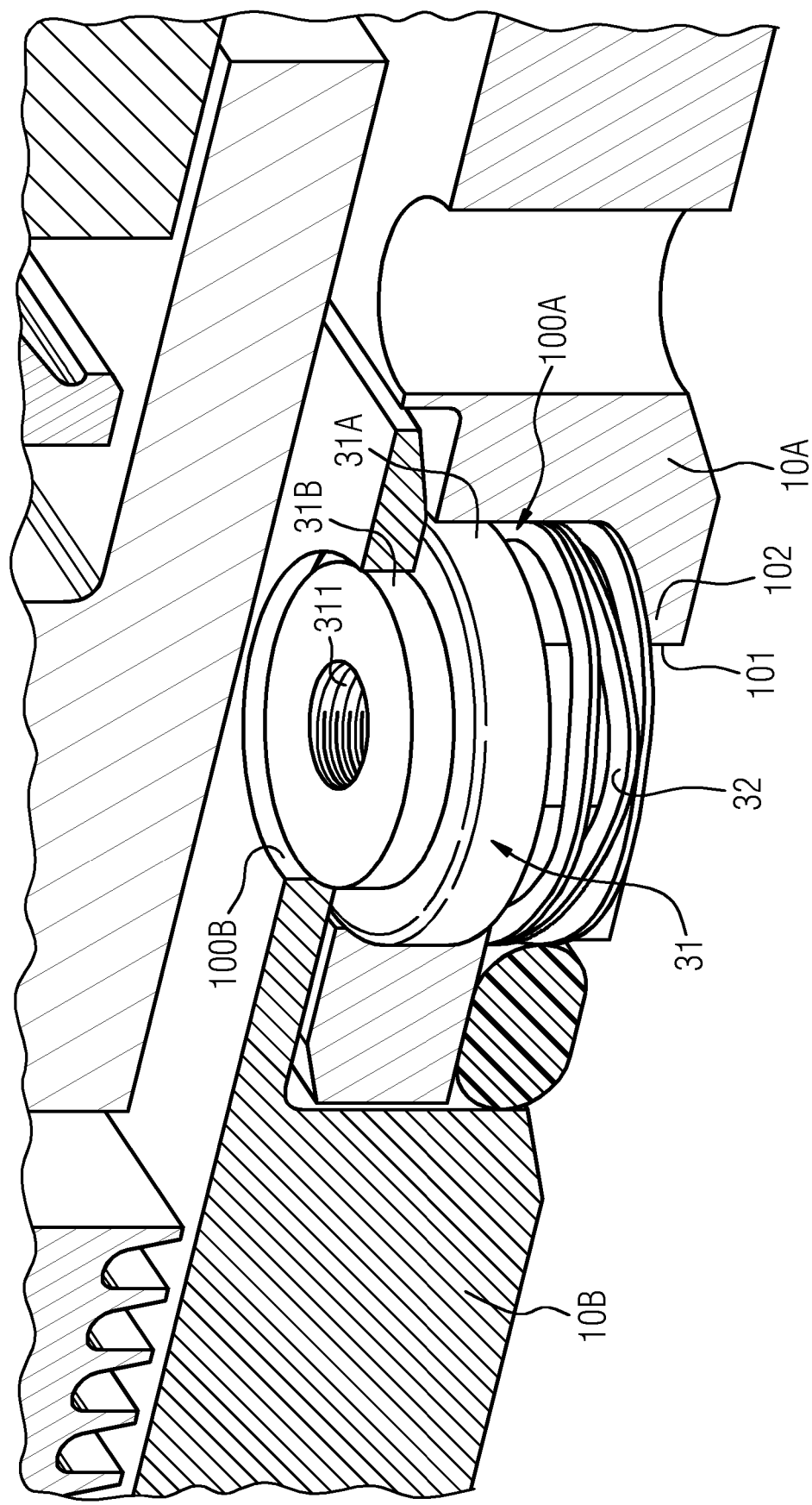
FIG. 4 Three-dimensional view of said another preferred pin locking device according to the invention.

Said spring 32 is preferentially characterized by a hollow shape, wherein its hollow part is configured for providing a free passage to the extraction tool 4, e.g. its cylindrical rod 4B, from the boring 101 towards the bore 310, so that it may interact with the pin body 31 free of a contact with the spring 32. Said spring 32 is for instance a coil or a cylindrical wave spring configured for extending and being compressed along its length, as shown in FIGS. 3 and 4. Preferentially, the pin cavity 100A and consequently at least the first part 31A of the pin body 31 have a cylindrical shape. In such a case, the pin cavity 100A and the pin body 31 comprise preferentially complementary means for preventing a rotation of the pin body 31 in the pin cavity 100A during screwing/unscrewing the extraction tool 4 within/from the bore 310. Said complementary means might be for instance a groove extending along a direction parallel to the longitudinal axis c on a cylindrical inner wall of the pin cavity or respectively on the external cylindrical surface of the pin body, and a projecting member extending radially on the external cylindrical surface of the pin body, or respectively on the cylindrical inner wall of the pin cavity, wherein the groove is configured for receiving said projecting member and serving as guide to the latter during a longitudinal (i.e. along said longitudinal axis C) displacement of the pin body 31 inside the pin cavity that would result from screwing or unscrewing, preventing therefore a rotation of the pin body inside said pin cavity. For instance, the pin body may comprise one or several grooves and/or one or several projecting members, wherein the pin cavity comprises for each groove, resp. each projecting member, of the pin body, a complementary projecting member, resp. groove. Of course, the skilled person may envisage other solutions for preventing a rotation of the pin body 31 during screwing/unscrewing: e.g. the first part and pin cavity might have a non-circular transverse section that would prevent any rotation around the longitudinal axis C during screwing/unscrewing. In such a case, the second part 31B is preferentially cylindrical. Also, the fixing means may take another form/type, like a hook and a complementary projecting member, or a tenon and mortise system, etc. The goal of the fixing part of the extraction tool 4 is to cooperate/interact with the fixing means of the pin body so that the pin body 31 is then fixed to the extraction tool, so that the latter may displace the pin body 31 longitudinally in the pin cavity 100A either for compressing the spring 32 or releasing the latter so as to unlock, resp. lock the first and second sealing components.

Indeed, when assembling the sealing components of the seal cartridge, the first sealing component 10A needs to be coupled/locked to the second sealing component 10B. In order to realize said coupling/locking, the method according to the invention comprises: locking the pin body 31 in the withdrawn position within the pin cavity 100A. For this purpose, the extraction tool 4 is inserted by an operator in the boring 101 of the first sealing component so that its fixing part may interact with the fixing means of the pin body 31. According to the preferred embodiments described in FIGS. 2-4, the fixing part is screwed within the bore 310, locking therefore the fixing part to the pin body, wherein a rotation of the head 4A in one direction (the screwing direction, that can be clockwise or counterclockwise) is configured for compressing the spring, while the rotation in the other direction (the unscrewing direction) is configured for releasing the spring.

Once the pin body 31 reached its withdrawn position at the end of the pin cavity 100A, the first sealing component might be positioned with respect to the second sealing component 10B until the pin cavity 100A is aligned on a corresponding locking cavity 100B of the second sealing component 10B. Depending on the shape of the pin body 31, the pin cavity and the locking cavity might have different shapes. For instance, the pin cavity 100A and the locking cavity 100B might be characterized by an identical transverse section if the locking cavity 100B is a blind cavity comprising an end capable to stop the longitudinal movement of the pin body 31 when the spring 32 is released (see FIG. 2). In such a case, the pin body 31 might be cylindrical, as well as the pin cavity and locking cavity, the pin cavity having the same diameter as the locking cavity, and the pin body being characterized by a diameter close to the diameter of the pin and locking cavities so that it enables a sliding of the pin body inside said cavities wherein the walls of said cavities serve as guide.

According to another embodiment, the pin cavity 100A and the locking cavity 100B might be characterized by a different transverse section if the locking cavity 100B is a throughout cavity free of an end capable to stop the longitudinal movement of the pin body 31 when the spring 32 is released (see FIGS. 3 and 4). In such a case, the pin body 31 might be cylindrical, as well as the pin cavity and locking cavity, the pin cavity having a diameter greater than the locking cavity, the pin body 31 being characterized by two cylindrical parts, a first cylindrical part 31A and a second cylindrical part 31B, wherein the first cylindrical part has a diameter close to the diameter of the pin cavity so that it enables a sliding of the first cylindrical part inside said pin cavity while preventing said first cylindrical part entering the locking cavity, the second cylindrical part having a diameter close to the diameter of the locking cavity so that it enables a sliding of the second cylindrical part inside said locking cavity wherein the walls of said locking cavity serve as guide. According to said configuration, the longitudinal motion of the pin body 31 when pushed away from the end of the pin cavity 100a is stopped by a surface S3 of the second sealing component 10B, the second part remaining in the pin cavity and the first part being received within the locking cavity.

After alignment of the pin cavity with the locking cavity, the spring 32 is released by removing the extraction tool 4 from the pin body 31, e.g. by unscrewing the latter from said pin body 31, said release resulting in a motion of the pin body 31 from the withdrawn position to the locked position wherein the first part 31A of the pin body 31 remains in the pin cavity 100A while the second part 31B of the pin body 31 is fitted and received inside said locking cavity 100B. At this stage the first sealing component and the second sealing component are locked together.

According to the present invention, a suitable dimensioning is necessary for enabling the locking of the first sealing component with the second sealing component. Based on the present disclosure, the skilled person will be able to determine convenient sizing for the pin body, pin cavity and locking cavity. As previously explained, the longitudinal size of the pin body, pin cavity, locking cavity and compressed spring shall verify the following rules:—the longitudinal size of the compressed spring added to the longitudinal size of the pin body shall entirely be comprised within the longitudinal size of the pin cavity when the pin body is in the withdrawn position; —in the locked position, the longitudinal size of the pin body shall enable having the first part 31A resting in the pin cavity while the second part is resting in the locking cavity 100B.

Finally, the spring 32 and the pin body 31 might be maintained attached or fixed to each other by suitable means, like a screw or welding, or might be two separate or independent components which have to be inserted one after the other one by an operator in each pin cavity of the first sealing component and maintained in the withdrawn position before starting assembling the first sealing component with the second sealing component.

To summarize, the present invention proposes a pin locking device 3 that facilitates the assembling of a seal cartridge 1 comprising one or several sealing components, preferentially ring shaped sealing components, configured for being mounted annularly around a rotatable shaft, wherein at least two of said sealing components are coupled/fixed to each other by means of one or several pin locking devices according to the invention. The latter makes the cartridge less complex and more compact, making it possible to quickly couple/fix sealing components in a manner free of any screws.

The invention claimed is:

1. A pin locking device for locking a first sealing component of a seal cartridge together with a second sealing component of said seal cartridge, the pin locking device comprising:

a pin body comprising a longitudinal bore extending along a longitudinal axis, wherein an inner wall of said bore comprises fixing means configured for cooperating with an extraction tool, the pin body comprising two parts arranged longitudinally one after the other along said longitudinal axis, namely a first part configured for fitting a pin cavity of the first sealing component and a second part configured for fitting a locking cavity of the second sealing component; and a spring configured for exerting a spring force against the pin body along said longitudinal axis, wherein said spring is configured for leaning, on one side, on a first contact surface of the pin cavity and for having its other side contacting a second contact surface, wherein said second contact surface is a surface of the pin body on which said bore opens out, wherein the spring force is configured for moving the pin body from a withdrawn position, where the pin body is entirely located within the pin cavity, towards a locked position where said second part is located and maintained within the locking cavity while the first part remains located within said pin cavity.

2. The pin locking device of claim 1, wherein the fixing means are configured for interacting with the extraction tool for compressing the spring and maintaining the pin body in the withdrawn position notably when assembling the first sealing component with the second sealing component, and the spring is configured for moving the pin body from the withdrawn position to the locked position when releasing said interaction.

3. The pin locking device of claim 1, wherein a transverse cross section of the second part is smaller than, and comprised within, a transverse cross section of the first part when the latter are projected onto a same plane perpendicular to the longitudinal axis.

4. The pin locking device of claim 1, wherein said fixing means is a screw thread formed around said inner wall.

5. The pin locking device of claim 1, wherein the first part and the second part are cylindrical.

6. A seal cartridge configured for providing a sealing between a rotatable shaft and a shaft casing, the seal cartridge having a hollow shape around a longitudinal axis, the seal cartridge comprising:

a set of sealing components configured for being removably assembled with each other so as to form the seal cartridge, wherein each of said sealing component is configured for being mounted annularly around the rotatable shaft;

wherein at least one of said sealing components, called hereafter the first sealing component, is configured for being secured to another one of said sealing components, called hereafter the second sealing component, by the pin locking device according to claim 1, wherein the first sealing component comprises said pin cavity and the second sealing component comprises said locking cavity.

7. The seal cartridge of claim 6, wherein the first sealing component comprises a boring throughout a wall of said first sealing component, said boring going from one side of the wall to the other side of the wall where it opens onto said first contact surface, wherein said boring, wherein the pin cavity, the bore of the pin body, and the locking cavity are configured for being aligned with each other when the first sealing component is assembled with the second sealing component.

8. The seal cartridge of claim 6,
wherein said hollow shape is a substantially cylindrical hollow shape around the longitudinal axis and the sealing components of said set are ring-shaped sealing components.

9. The seal cartridge of claim 6,
wherein the first sealing component is characterized by an inner diameter configured for matching the size of the shaft.

10. The seal cartridge according to claim 9,
wherein said first sealing component comprises a shaft sleeve.

11. The seal cartridge according to claim 6,
wherein the first sealing component is characterized by an outer size or diameter configured for matching the size of the shaft casing.

12. The seal cartridge according to claim 11,
wherein said first sealing component comprises a housing component.

13. The seal cartridge according to claim 6,
wherein the first sealing component is configured for remaining stationary during a rotation of the rotatable shaft.

14. The seal cartridge according to claim 6,
wherein the first sealing component comprises at least one part configured for rotating together with the rotatable shaft during a rotation of the rotatable shaft.

15. The seal cartridge according to claim 6,
wherein the first sealing component is a housing component of the seal cartridge and said second sealing component is:
a labyrinth seal of the seal cartridge; or
another housing component of the seal cartridge; or
a barrier seal of the seal cartridge; or
a stationary sleeve of the seal cartridge; or
a stationary seal ring of the seal cartridge.

16. The seal cartridge according to claim 6,
wherein the first sealing component is a rotatable shaft sleeve of the seal cartridge and said second sealing component is:
another shaft sleeve of the seal cartridge; or
a rotatable seal ring of the seal cartridge; or
another component of the seal cartridge configured for rotating together with the rotatable shaft sleeve.

* * * * *